Jan. 8, 1957 V. J. BILLSTROM 2,776,853
CLAMPING DEVICE
Filed Sept. 20, 1954 2 Sheets-Sheet 1

INVENTOR.
VICTOR J. BILLSTROM
BY HIS ATTORNEYS.
HARRIS, KIECH, FOSTER & HARRIS

Jan. 8, 1957 V. J. BILLSTROM 2,776,853
CLAMPING DEVICE
Filed Sept 20, 1954 2 Sheets-Sheet 2
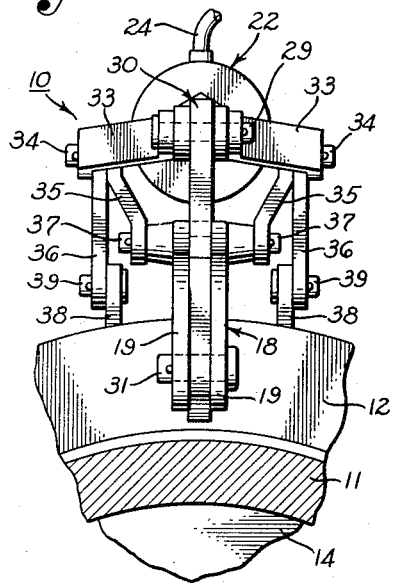
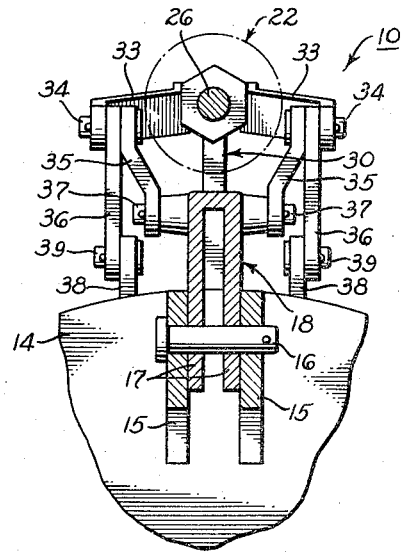
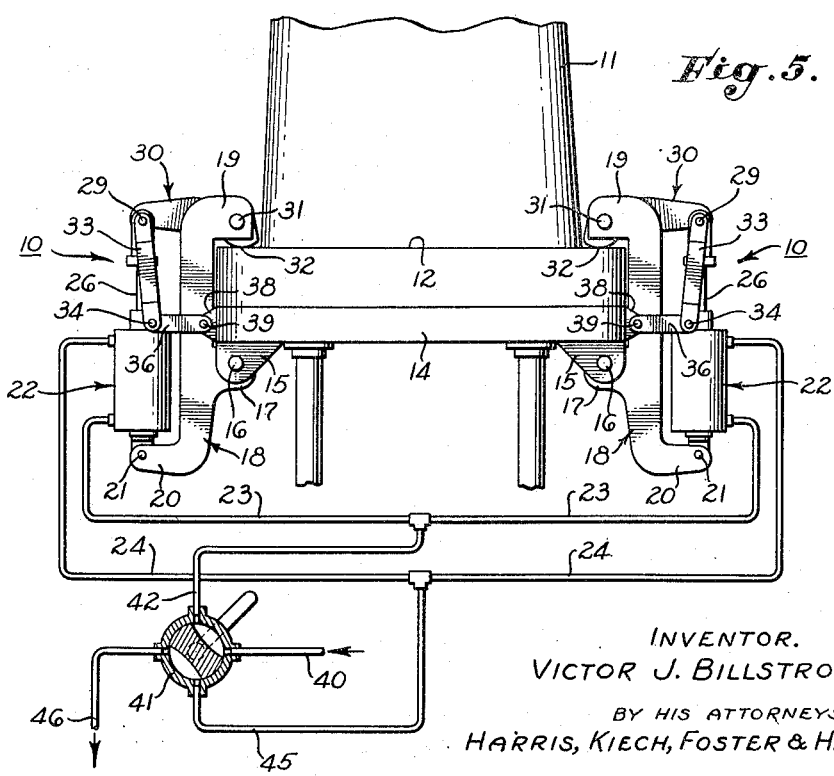
INVENTOR.
VICTOR J. BILLSTROM
BY HIS ATTORNEYS.
HARRIS, KIECH, FOSTER & HARRIS United States Patent Office 2,776,853
Patented Jan. 8, 1957

2,776,853

CLAMPING DEVICE

Victor J. Billstrom, Pasadena, Calif., assignor to Fletcher Aviation Corporation, Pasadena, Calif., a corporation of California Application September 20, 1954, Serial No. 457,198

13 Claims. (Cl. 292—256)

The present invention relates to a new and improved clamping device which is primarily designed to be used in clamping a first member having an external flange or similar surface against a second member and quickly releasing said first member from said second member.

A broad object of the present invention is to produce a clamping device of the class described which is a substantial improvement over the prior devices previously utilized for the same purpose. A more specific object is to provide a clamping device which is operated by fluid or air under pressure and which can be used to apply a large amount of pressure in order to accomplish the desired clamping. Still a further object of the invention is to provide a clamping device which can be simultaneously and quickly operated and released together with a plurality of other clamps by the use of fluid pressure.

The precise nature and substance of this invention is best set forth in the appended claims. Briefly, however, it may be stated that the invention is concerned with a clamping device including a rocking arm pivotally mounted on a first member, a clamping arm pivotally mounted on said rocking arm, means for rotating said rocking arm about the member upon which it is pivotally mounted, said means being connected to said clamping arm and being operative to rotate said clamping arm so as to cause said cam surface to engage said first member. More specifically, the invention is concerned with a device as described in the preceding sentence in which the means referred to include extensible actuating means, such as, for example, a hydraulic servo-motor pivotally mounted on said rocking arm and pivotally connected to said clamping arm, and linkage means operatively connected to said extensible means at a point remote from said rocking arm for moving said rocking arm.

It is considered that the actual details of the invention are best more fully defined or summarized by the appended claims and are best fully explained by reference to the accompanying drawings, in which:

Fig. 3 is an end view taken at line 3—3 of Fig. 2;

Fig. 4 is a cross-sectional view taken at line 4—4 of Fig. 2; and

Fig. 5 is a view illustrating the use of a series of clamping devices of the invention.

Figure 2:
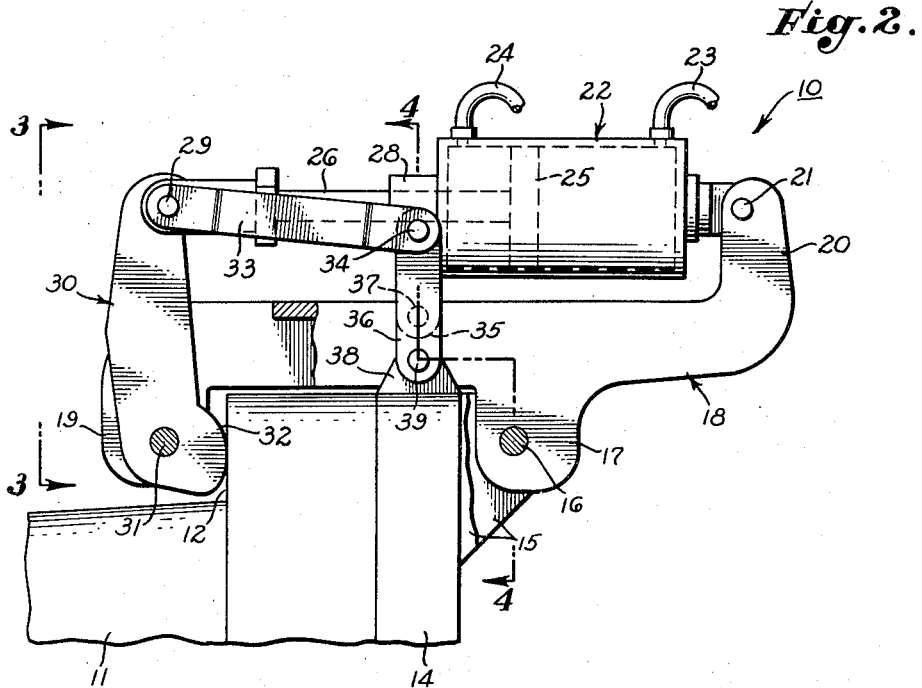
Fig. 2 is a similar side view showing the clamping device in a closed position.

In these drawings there is shown an automatic clamping device 10 which is designed to hold a first member 11, which may be an autoclave having an external flange 12, against a second member 14 which may be the cover of the autoclave. The member 14 is provided with a projection 15 upon which there is held by means of a pivot or pin 16 a projection 17 of a rocking arm 18. It is apparent from the drawing that this rocking arm is designed so as to project generally beyond the flange 12 when the clamping device 10 is in a clamping position as indicated in Fig. 2 so as to position a projection 19 upon the rocking arm 18 beyond the flange 12.

Figure 1:
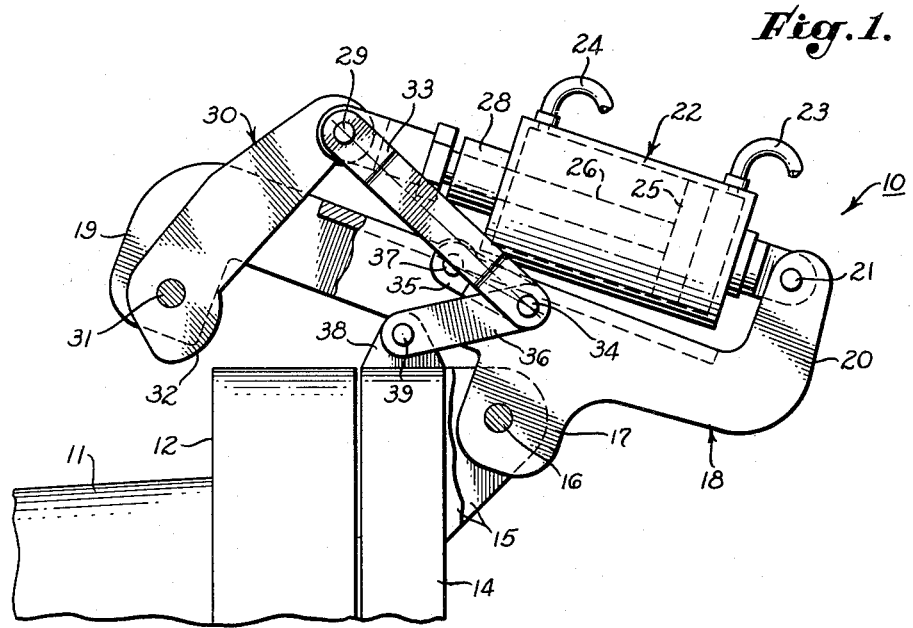
Fig. 1 is a side view of an automatic clamping device of the invention in an open position.

A double-acting hydraulic servo-motor of substantially conventional design includes a cylinder 22 mounted upon a projection 20 of the rocking arm 18 by means of a pivot or pin 21. This projection 20 extends from the rocking arm 18 in the opposite direction from the projection 19. This cylinder 22 includes conduits or pipes 23 and 24 for conveying and removing hydraulic fluid or air from it to actuate the servo-motor. A piston 25 is disposed in cylinder 22 and has a connecting rod 26 which projects out through a bushing 28 in one end of the cylinder 22. The connecting rod 26 is attached externally of the cylinder 22 by means of a pivot or pin 29 to a clamping arm 30 which is attached by means of a pivot or pin 31 to the projection 19 on the rocking arm 18. The clamping arm 30 includes a cam surface 32 which is positioned as shown in Figs. 1 and 2 adjacent the flange 12 of the first member 11. When the clamping arm 30 is held in a position such as is indicated in Fig. 1 of the drawings, this cam surface 32 does not make contact with the flange 12. When, however, the clamping arm 30 is in the general position indicated in Fig. 2 of the drawings, this cam surface 32 is clamped against the flange 12 by further movement of the piston 25. The precise position of the clamping arm 30 is, of course, governed by the position of the attached connecting rod 26 extending from the cylinder 22.

The exact location of the rocking arm 18 during the operation of the clamping device 10 is governed by means of the hydraulic servo-motor through the use of a first link 33 which is attached by means of the pivot 29 to the connecting rod 26 and which is also attached by means of a pivot or pin 34 to second and third links 35 and 36, respectively. The link 35 is also pivotally attached to the rocking arm 18 by means of a pivot or pin 37, and the link 36 is pivotally attached to a projection 38 on cover 14 by means of a pivot or pin 39.

As is readily seen from Fig. 1 of the drawings, when the rocking arm 18 is in a position generally moved away from the first member 11, the pivots 37 and 39 are positioned along the same side of a line drawn between the pivots 29 and 34 so that the angle formed by lines drawn between the pivots 29, 34 and 37, as indicated in this figure, is thus less than the angle formed by lines drawn between the pivots 29, 34 and 39. As the servo-motor is actuated so as to extend the connecting rod 26, the positions of the various linkages are changed, causing rotation of the pivot 34 about the fixed pivot 39 on the projection 38. This, in turn, results in movement of the pivot pin 37 about this fixed pivot 39. Such movement is responsible for movement of the rocking arm 18 from the position shown in Fig. 1 to the position shown in Fig. 2. When the piston 25 is pulled into the cylinder 22, the pivot 29 is pulled towards the cylinder and the pivot 34 rotates back about the pivot 39 from the position indicated in Fig. 2 to the position indicated in Fig. 1.

Initial movement of the piston and connecting rod 26 to the right (Figures 2 and 1) will rotate the clamping arm 30 clockwise thereby releasing the clamping pressure exerted by cam surface 32 on the flange 12. As the connecting rod 26 continues to move to the right, the kinematics of the links 33, 35 and 36 will cause clockwise rotation of the rocking arm 18 about pivot 16 to move the entire clamping assembly clockwise thus removing the clamping cam surface 32 from behind the flange 12. In the fully retracted position, Figure 1, all parts of the clamp are maintained in a position to permit free relative axial separation of cover 14 and body flange 12. Reverse operation of the servo-motor 22 will initially lower the rocking arm 18 and at the same time start counterclockwise rotation of clamping arm 30. The final counterclockwise rotation of clamping arm 30 occurs during the period when the axes of rocking arm linkage pivots 34, 37 and 39 are approaching their vertically aligned condition (Figure 2) thus movement of the rocking arm, during the final clamping period, is negligible. Such final clamping arm rotation, through cam surface 32, exerts a tight clamping force between the cover 14 and body flange 12 and all resultant stress is transmitted to the rocking arm 18 through pivot pins 31 and 21.

Those skilled in the art will realize that the herein described and disclosed invention is of relatively simple construction, and that a number of modifications may be made within the precise construction indicated without departing from the essential teachings of this disclosure. As an example of such modifications, the cylinder 22 may be turned around from the position shown in the drawings so that the connecting rod 26 is attached by means of a pivot 21 to the projection 20, and the other end of the cylinder 22 is connected to the pivot 29. All such modifications of this type which do not affect the basic operation of the instant invention are to be considered as part of the inventive concept insofar as they are defined by the appended claims.

One major advantage of the invention lies in the fact that a number of individual clamping devices 10 may be operated simultaneously from a single source of hydraulic fluid. In the apparatus illustrated in Fig. 5, hydraulic fluid under pressure from a source (not shown) is conveyed through a pipe 40 to a valve 41, which, when turned to an open position, permits this fluid to pass from the pipe 40 through a pipe 42 to lateral pipes 23 into ends of the hydraulic cylinders 22 on individual clamping devices 10, actuating these clamping devices as previously indicated. As hydraulic fluid flows from the pipe 40 into the pipe 42 in this manner, fluid is exhausted from the other ends of the cylinders 22 through the pipes 24 into a common pipe 45 connected to the valve 41. Fluid flowing through this pipe 45 thence flows out of the system through an outlet pipe 46. When the valve 41 is rotated to a second position to reverse the operation of the clamping devices 10, fluid coming through the pipe 40 flows into the pipe 45, thence into the pipes 24 and the hydraulic cylinders 22, changing the positions of the pistons within these cylinders. Simultaneously, fluid is exhausted from the other ends of these cylinders through the pipes 23 and the pipe 42, and flows through the valve 41 out through the pipe 46. Obviously, a great many more clamping devices of the instant invention can be utilized together than are specifically illustrated in Fig. 5 of the drawings.

Those skilled in the art will realize that a number of modifications may be made within the scope of this disclosure without departing from the essential teachings thereof. As an example of such modifications, it is possible to substitute solenoids for the hydraulic cylinders shown, although such substitution is not usually considered desirable because of the properties of solenoids. The principal advantage of the instant invention results from the fact that a large number of clamping devices as herein described can be utilized together so as to result in a substantial saving in labor cost and time required to clamp and unclamp various units. Frequently, the time consideration alone is exceedingly important where it is necessary to have quick access to the interior of a pressure vessel following the completion of a given operation.

I claim as my invention:

1. A clamping device adapted to clamp a first member solidly against a second member, which comprises: a rocking arm pivotally mounted on said second member and having an extension that can extend down into clamping position with regard to said first member; a hydraulic cylinder containing a piston and having a piston rod that is rigidly secured to said piston, said piston rod extending outside said cylinder and carrying a piston rod pivot pin at its outer end; a clamping arm pivoted on said rocking arm and including an upper portion which engages said piston rod pivot pin and a lower portion placed so as to engage said first member when the device is in clamping position; a first link engaging said piston rod pin at one end of said link and carrying a first link pin at its other end; a second link pivotally engaging said first link pin at one end and pivotally connected to said second member at its other end; and a third link of somewhat shorter length than said second link which is pivotally connected to said first link pin at one end and pivotally connected at the other end to said rocker arm.

2. A clamping device as claimed in claim 1 in which said lower portion of said clamping arm is of cam formation engaging said first member.

3. An automatic clamping device for automatically clamping a first member against a second member, which comprises: a rocking arm pivotally mounted on said second member; a clamping arm pivotally mounted on said rocking arm and including a cam surface adapted to engage said first member during the clamping of said first member against said second member; extensible means pivotally mounted on said rocking arm and pivotally connected to said clamping arm for moving said clamping arm; and linkage means operatively connected to said extensible means at a point remote from said rocking arm, to said rocking arm and to said second member for pivotally moving said rocking arm.

4. An automatic clamping device for clamping a first member against a second member, which comprises: a rocking arm pivotally mounted on said second member; a clamping arm including a cam surface adapted to engage said first member during the clamping of said first member against said second member, said clamping arm being pivotally mounted on said rocking arm; and means for rotating said rocking arm about said second member, said means being connected to said clamping arm and being operative to rotate said clamping arm so as to cause a wedging action of said cam surface toward and against said first member.

5. Means for clamping a first member against a second member, which comprises: a plurality of individual, automatic clamping devices, each of said devices including a rocking arm pivotally mounted on said second member, a clamping arm including a cam surface adapted to engage said first member during the clamping of said first member against said second member, said clamping arm being pivotally mounted on said rocking arm, and means for rotating said rocking arm about said second member, said means being connected to said clamping arm and being operative to rotate said clamping arm so as to cause said cam surface to engage said first member; and means for simultaneously actuating each of said clamping devices.

6. An automatic clamping device for clamping a first member having an abutment surface against a second member comprising: a rocking arm pivotally mounted on said second member and extending therefrom beyond said first member; a double acting servo-motor having at least two relatively moving parts, one of said parts being pivotally mounted on said rocking arm; a clamping arm, including a cam surface, pivotally mounted on said rocking arm with said cam surface located so that when said rocking arm is in a given position said clamping arm may be rotated causing said cam surface to bear against the abutment surface of said first member to clamp said first member against the second member, said clamping arm being pivotally attached to the second of said servo-motor parts so as to be capable of being moved when said servo-motor is actuated; a first link, pivotally attached to said second servo-motor part, adapted to be moved when said servo-motor is actuated; a second link pivotally attached to said first link at a point remote from the point at which said first link is pivotally attached to said second servo-motor part, said second link also being pivotally attached to said second member; and a third link pivotally attached to said first link at a point remote from the point at which said first link is pivotally attached to said second servo-motor part, said third link also being pivotally attached to said rocking arm.

7. An automatic clamping device as defined in claim 6, wherein said one part of said double acting servo-motor is pivotally mounted on a side of said rocking arm remote from said first and second members.

8. A clamping device as defined in claim 6, wherein said rocking arm includes a portion projecting from the main portion of said rocking arm towards said second member, said portion being adapted to fit behind said second member when said rocking arm is in a clamping position, and wherein said clamping arm is pivotally mounted on said projection of said rocking arm.

9. A clamping device comprising: a support; a rocking member pivoted on said support; a clamping element pivotally carried by the rocking member; an actuating means; and means operatively connecting said actuating means to said rocking member, clamping member and support so actuation of said actuating means will rock said pivotally connected rocking member and clamping member relative to said support and move said clamping member about its pivot axis relative to said rocking member.

10. A clamping device comprising: a support; a structural element; a first pivot means mounting said structural element on said support; a lever; a second pivot means having an axis parallel to and spaced from the axis of said first pivot means, mounting said lever on said structural element; an actuator; means operatively connecting said actuator to said support, said structural element and said lever so actuation of said actuator will pivot said structural element with said lever about said first pivot means and also pivot said lever about said second pivot means.

11. An automatic clamping device for clamping two members together comprising: a rocking arm pivotally mounted on one of said members; a clamping arm including an abutment adapted to engage the other of said members during the clamping of the two members together, said clamping arm being pivotally mounted on said rocking arm; means operatively connected to said one member, said rocking arm and said clamping arm for rotating said rocking arm about said second member and for rotating said clamping arm on said rocking arm.

12. A clamping device comprising: a support, a structural element, a first means pivotally mounting said structural element on said support, an extensible actuator disposed on said structural element, a lever pivoted on said structural element at a location remote from said first means, a second means connecting said lever and said extensible actuator and a third means distinct from said structural element connecting between said support and said extensible actuator at a position on said extensible actuator remote from said first means whereby extension of said extensible actuator will pivot said structural element and said lever relative to said support and also pivot said second lever relative to said first lever thereby moving it relative to said support structure.

13. A clamping device adapted to clamp a first member solidly against a second member comprising: a structural element pivotally mounted on said second member; a double acting servo-motor having a movable rod; a clamping arm pivoted on said structural element including an end portion pivotally connected to said movable rod and a second portion disposed to engage said first member when the device is in clamping position; three links, the first link being pivotally connected adjacent one end to said rod and adjacent its opposite end to the ends of the second and third links, and the other ends of said second and third links being pivotally connected respectively to said second member and said structural element.

References Cited in the file of this patent

UNITED STATES PATENTS

| 1,439,000 | Jacobs | Dec. 19, 1922 |
| 1,951,922 | Cantrell | Mar. 20, 1934 |